(No Model.) 2 Sheets—Sheet 2.

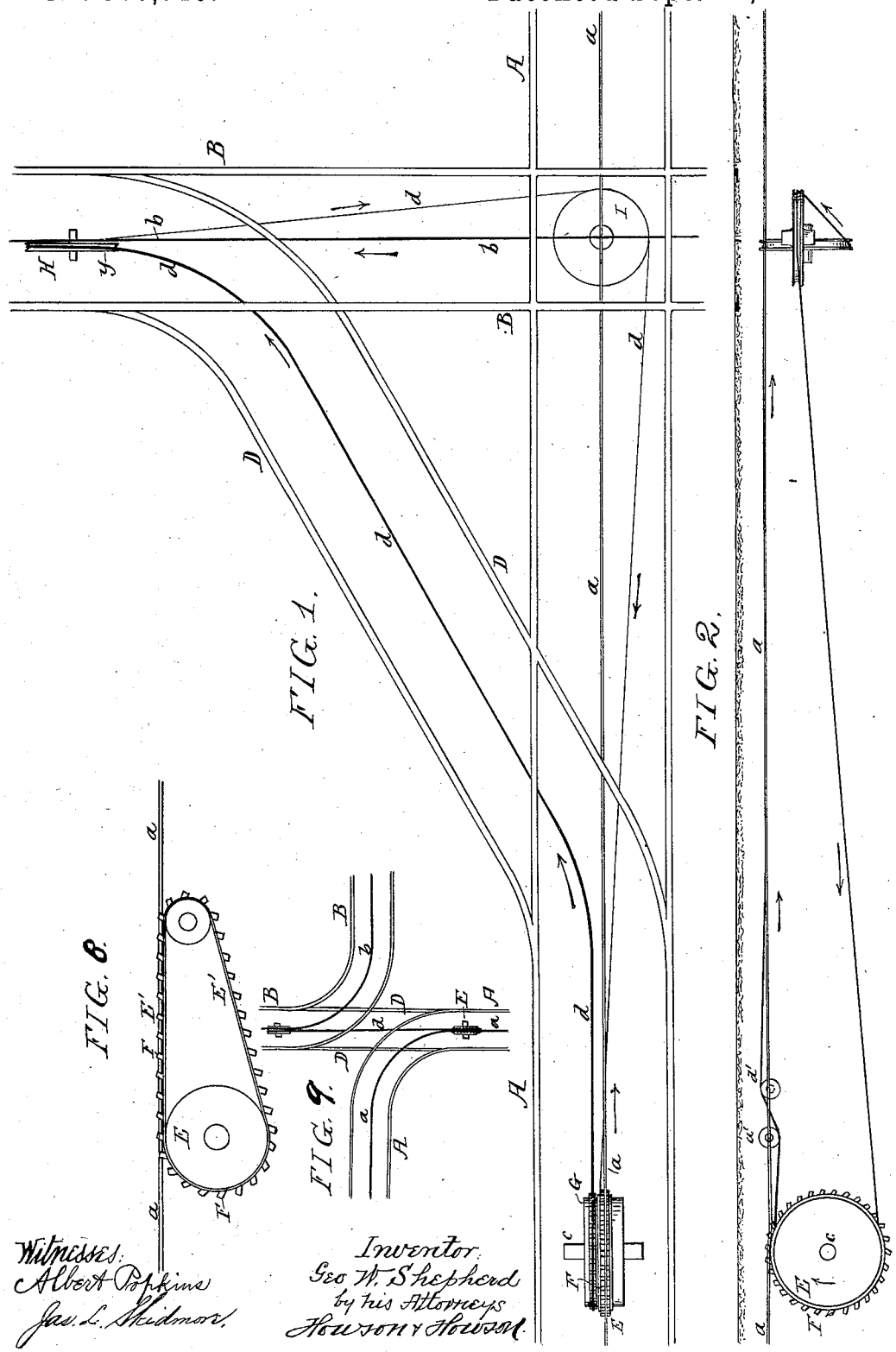

G. W. SHEPHERD.
CABLE RAILWAY.

No. 389,719. Patented Sept. 18, 1888.

WITNESSES:
David S. Williams
William D. Conner

INVENTOR
Geo. W. Shepherd
by his Attorneys
Howson & Howson

UNITED STATES PATENT OFFICE.

GEORGE W. SHEPHERD, OF PHILADELPHIA, PENNSYLVANIA.

CABLE RAILWAY.

SPECIFICATION forming part of Letters Patent No. 389,719, dated September 18, 1888.

Application filed May 11, 1888. Serial No. 273,582. (No model.)

*To all whom it may concern:*

Be it known that I, GEORGE W. SHEPHERD, a citizen of the United States, and a resident of Philadelphia, Pennsylvania, have invented certain Improvements in Cable Railways, of which the following is a specification.

The object of my invention is to connect the cables of two or more independent cable railways with a short cable in such a manner that the short cable will be positively driven from one of said cables, so that a car passing onto the connecting tracks can be gripped to a power-driven connecting-cable for effecting the transfer, as fully described hereinafter.

Figure 3:
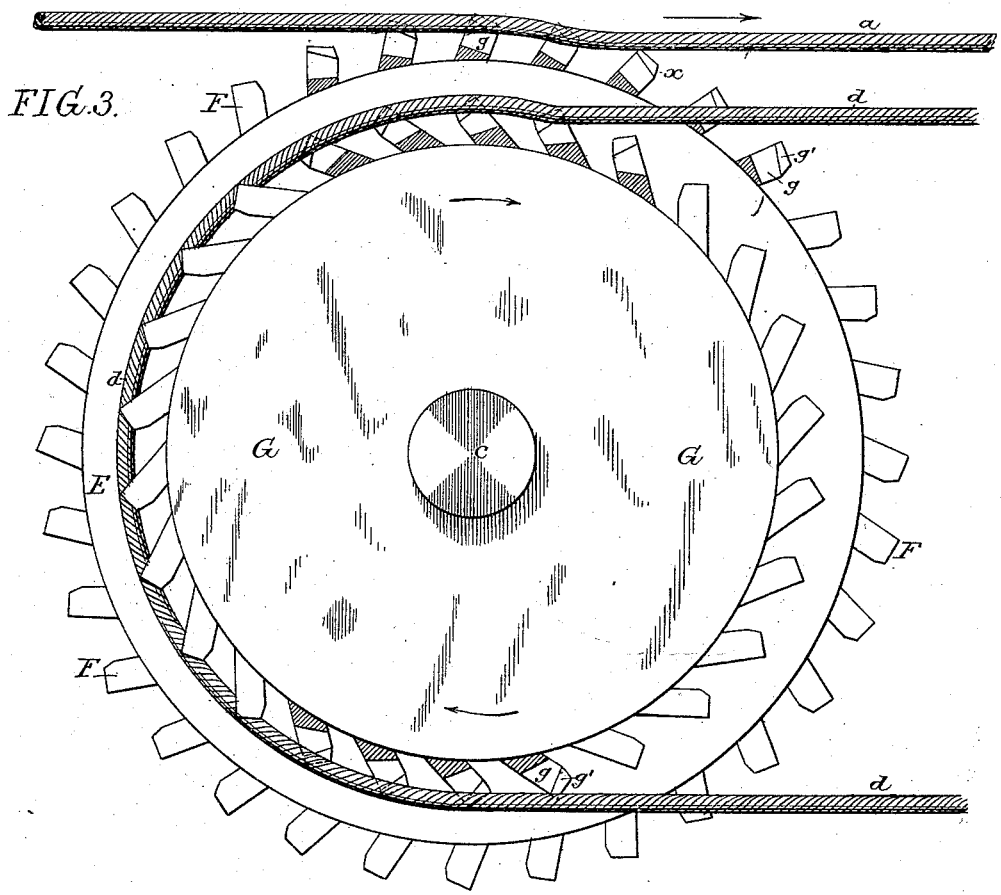
Figure 4:
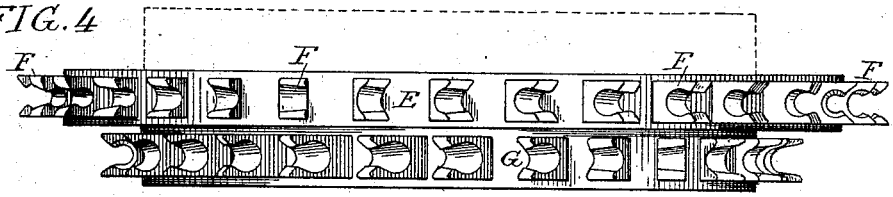
Figure 7:
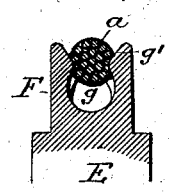
Figure 6:
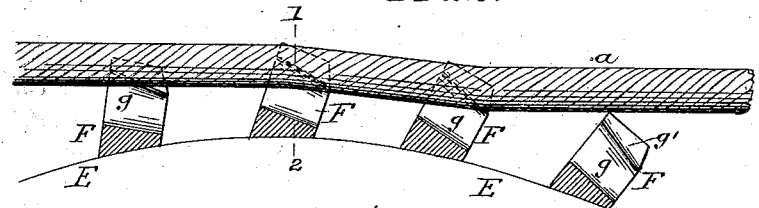
Figure 5:
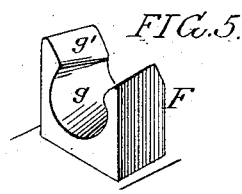

In the accompanying drawings, Figure 1 is a diagram plan view of my invention applied to the curve-connection of a cable railway. Fig. 2 is a diagram section of the same. Fig. 3 is a side view of my improved wheel for connecting the main cable to the curve-cable. Fig. 4 is a plan view of the wheel. Fig. 5 is a perspective view of one of the teeth. Fig. 6 is an enlarged sectional view of part of the wheel. Fig. 7 is a section on the line 1 2, Fig. 6; and Figs. 8 and 9 are views of modifications.

Referring to the drawings, A A are the rails of the main track of a cable railway.

$a$ is the driven cable.

B B are the rails of a track of a cable railway crossing the track A. $b$ is the cable by which the cars on this track are propelled.

D D are the curved rails of a track connecting with the two tracks A B, and $d$ is the curve-cable, being in the form of an endless cable, as shown in Fig. 1. The cars in this instance are supposed to be propelled in the direction of the arrows, Fig. 1.

I have shown only one set of tracks and one curve; but it will be evident that two or more tracks can be used and two or more curveways without departing from my invention.

The rails have, at the junction of the main with the curve rails, the usual switches, and the slot also has the usual switch used in cable railways, so that a car may be transferred from one track to the other. Near the junction of the two tracks is a wheel, E. On the periphery of this wheel is a series of teeth, F, of the peculiar shape shown in the perspective view, Fig. 5. Each tooth has a tapered opening, $g$, narrowing from the front to the rear of the tooth, and having a tapering mouth, forming with the opening a rib, $g'$. When the cable $a$ enters the tapered mouth of the tooth, therefore, these ribs engage with the strands of the cable, as shown in Figs. 3, 6, and 7, and as the cable is moved in the direction of its arrow, Fig. 3, it will turn the wheel in the direction of its arrow, one tooth after another coming into position to impinge upon and hold fast to the cable, thus causing the rotation of the wheel; but when the teeth arrive at the point $x$, Fig. 3, they will, owing to their rear portions being flared, slip from the cable. While the teeth are engaged with the cable, however, they are held securely and cannot slip. This wheel E has an axle, $c$, mounted in suitable bearings in the cable-conduit. At one side of the wheel E, in the present instance, is a wheel, G, forming part of the wheel E. This wheel G may or may not be provided with teeth similar to those of the wheel E; but I prefer, where circumstances permit, to provide it with a series of teeth set in the reverse direction to those of the wheel E, as shown. The cable $d$ passes around this rope-wheel G, as shown in Figs. 1, 2, and 3, and through the curve-conduit and around a wheel, H, situated near where the curve-tracks join the cross-tracks B, and the cable $d$ passes around a pulley or wheel, I, preferably at the junction of the two cross-cables, as shown in Fig. 1. This curve-cable is an endless cable, as shown, and is guided around the curve by suitable guide-wheels, common to cable railways. After the curve-cable leaves the wheel G it is depressed by a roller, $a'$, and then raised by a roller, $d'$, and kept in the raised position, even with the grip, until the point $y$ is reached. Thus it will be seen that if the grip is thrown off, either automatically or by hand, from the main cable, and if the switch is so set that the car will pass around the curve, the curve-cable is in such a position in regard to the grip that by opening the grip the cable will pass into the same, as in ordinary cable-railway constructions.

Where two turn outs or curves are used, the wheel may be duplicated, as shown by dotted lines in Fig. 4—that is, the curve-wheels may be placed on each side of the main gripping-wheel.

In some instances, where a longer bite is required than can be obtained through the medium of the wheel and its teeth, an endless chain belt, E', may be used, as shown in Fig. 8, having teeth on its periphery of the same character as those shown in Fig. 5, and these teeth, in this instance, engage with the cable, which rests upon the belt, so that a much more powerful grip may be had than by the use of the wheel. The wheel is driven directly from this endless belt, as shown in Fig. 8.

In some instances the cables of the two main lines may be connected by a straight connecting-cable, as shown in Fig. 9, the character of the connecting-cable depending upon the position of the main cables in respect to each other.

I claim as my invention—

1. The combination, in a cable railway, of the main cable and the curve-cable with a wheel provided with teeth having tapered openings with ribs to grip the main cable, and a supplementary wheel or drum for driving the curve-cable, as set forth.

2. The combination, in a cable railway, of the main and curve cables with the wheels E and G, each provided with teeth having tapered openings with ribs therein, one set of teeth engaging with the main cable and the other set engaging with the curved connecting-cable, all substantially as set forth.

3. A wheel or equivalent driving device, substantially as described, having teeth adapted to engage with a cable, said teeth having tapered orifices with ribs for engaging with the cable, all substantially as set forth.

In testimony whereof I have signed my name to this specification in the presence of two subscribing witnesses.

GEORGE W. SHEPHERD.

Witnesses:
WILLIAM D. CONNER,
HENRY HOWSON.